United States Patent
Miki et al.

(10) Patent No.: US 10,505,184 B2
(45) Date of Patent: Dec. 10, 2019

(54) NEGATIVE ELECTRODE ACTIVE MATERIAL FOR ELECTRIC DEVICE AND ELECTRIC DEVICE USING THE SAME

(71) Applicant: Nissan Motor Co., Ltd., Yokohama-shi, Kanagawa (JP)

(72) Inventors: Humihiro Miki, Kanagawa (JP); Tomohiro Kaburagi, Kanagawa (JP); Manabu Watanabe, Kanagawa (JP); Nobutaka Chiba, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 115 days.

(21) Appl. No.: 15/537,324

(22) PCT Filed: Dec. 17, 2014

(86) PCT No.: PCT/JP2014/083480
§ 371 (c)(1),
(2) Date: Jun. 16, 2017

(87) PCT Pub. No.: WO2016/098214
PCT Pub. Date: Jun. 23, 2016

(65) Prior Publication Data
US 2017/0352882 A1    Dec. 7, 2017

(51) Int. Cl.
*H01M 2/10* (2006.01)
*H01M 4/38* (2006.01)
*H01M 10/0525* (2010.01)
*H01M 4/02* (2006.01)

(52) U.S. Cl.
CPC ....... *H01M 4/386* (2013.01); *H01M 10/0525* (2013.01); *H01M 2004/027* (2013.01); *H01M 2220/20* (2013.01)

(58) Field of Classification Search
CPC ...... H01M 4/134; H01M 4/139; H01M 4/386; H01M 4/387
USPC ..................................................... 429/218.1
See application file for complete search history.

(56) References Cited

U.S. PATENT DOCUMENTS

| | | |
|---|---|---|
| 2006/0040182 A1 | 2/2006 | Kawakami et al. |
| 2007/0148544 A1 | 6/2007 | Le |
| 2008/0081260 A1 | 4/2008 | Yamamoto et al. |
| 2008/0113271 A1 | 5/2008 | Ueda et al. |
| 2009/0061322 A1 | 3/2009 | Kawakami et al. |
| 2011/0117449 A1 | 5/2011 | Le |
| 2012/0034517 A1 | 2/2012 | Utsugi et al. |
| 2013/0130101 A1 | 5/2013 | Kim et al. |
| 2013/0302691 A1 | 11/2013 | Sawada |
| 2016/0141613 A1 | 5/2016 | Miki et al. |
| 2016/0285076 A1 | 9/2016 | Yamamoto et al. |

FOREIGN PATENT DOCUMENTS

| | | | |
|---|---|---|---|
| EP | 1638158 A2 | | 3/2006 |
| JP | 2002367602 A | * | 12/2002 |
| JP | 2004311429 A | | 11/2004 |
| JP | 2007172858 A | | 7/2007 |
| JP | 2009521792 A | | 6/2009 |
| JP | 2012150910 A | | 8/2012 |
| JP | 2012527741 A | | 11/2012 |
| JP | 2014107132 A | | 6/2014 |
| WO | 2005057715 A1 | | 6/2005 |
| WO | 2006129415 A1 | | 12/2006 |
| WO | 2014080895 A1 | | 5/2014 |
| WO | 2014199785 A1 | | 12/2014 |

* cited by examiner

*Primary Examiner* — Miriam Stagg
*Assistant Examiner* — Claire L Roe
(74) *Attorney, Agent, or Firm* — Young Basile Hanlon & MacFarlane, P.C.

(57) ABSTRACT

A negative electrode active material for electric device is used which includes a silicon-containing alloy having a structure in which a silicide phase containing a silicide of a transition metal is dispersed in a parent phase containing amorphous or low crystalline silicon as a main component and a predetermined composition and in which a ratio value (B/A) of a diffraction peak intensity B of a silicide of a transition metal in a range of $2\theta=37$ to $45°$ to a diffraction peak intensity A of a (111) plane of Si in a range of $2\theta=24$ to $33°$ is 0.41 or more in an X-ray diffraction measurement of the silicon-containing alloy using a CuK$\alpha$1 ray.

10 Claims, 4 Drawing Sheets

Si59Sn22Ti19_50h (EXAMPLE 4)

Si90Ti10_24h (COMPARATIVE EXAMPLE)

NEGATIVE ELECTRODE ACTIVE MATERIAL FOR ELECTRIC DEVICE AND ELECTRIC DEVICE USING THE SAME

TECHNICAL FIELD

The present invention relates to a negative electrode active material for electric device, and an electric device using the same. The negative electrode active material for electric device and the electric device using the same according to the present invention are used in a driving power source and an auxiliary power source for motors of vehicles such as electric vehicles, fuel cell vehicles, and hybrid electric vehicles as secondary batteries, capacitors, and the like.

BACKGROUND

In recent years, cut down of the amount of carbon dioxide has been ardently desired in order to cope with air pollution and global warming. In the motor vehicle industry, cut down of carbon dioxide emissions due to introduction of electric vehicles (EV) and hybrid electric vehicles (HEV) has been highly expected, and development of electric devices such as secondary batteries for driving motors, which hold the key to practical use of these has been actively carried out.

The secondary batteries for driving motors are required to exhibit extremely high-output characteristics and high energy as compared to consumer lithium ion secondary batteries to be used in mobile phones, notebook computers, and the like. Hence, lithium ion secondary batteries having the highest theoretical energy among all the batteries have attracted attention, and development thereof is rapidly advanced at present.

A lithium ion secondary battery generally has a configuration in which a positive electrode in which a positive electrode active material and the like are coated on both sides of a positive electrode current collector by using a binder and a negative electrode in which a negative electrode active material and the like are coated on both sides of a negative electrode current collector by using a binder are connected to each other via an electrolyte layer and housed in a battery case.

Hitherto, a carbon and graphite-based material, which is advantageous from the viewpoint of lifespan of charge and discharge cycles and cost, has been used in the negative electrode of a lithium ion secondary battery. However, in the case of a carbon and graphite-based negative electrode material, charge and discharge proceed by occlusion and release of lithium ions into and from the graphite crystals, and there is thus a disadvantage that a charge and discharge capacity that is equal to or higher than the theoretical capacity, 372 mAh/g, to be obtained from $LiC_6$ of the maximum lithium-introduced compound is not obtained. For this reason, it is difficult to obtain a capacity and an energy density which satisfy the practical use level of a vehicle application from a carbon and graphite-based negative electrode material.

In contrast, a battery using a material to be alloyed with Li in the negative electrode is expected as a negative electrode material in a vehicle application since the energy density is improved as compared to a conventional carbon and graphite-based negative electrode material. For example, a Si material occludes and releases 3.75 mol of lithium ions per 1 mol as in the following Reaction Formula (A) in charge and discharge, and the theoretical capacity is 3600 mAh/g in $Li_{15}Si_4$ (=$Li_{3.75}Si$).

[Chemical Formula 1]

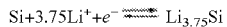 (A)

However, in a lithium ion secondary battery using a material to be alloyed with Li in the negative electrode, expansion and contraction of the negative electrode at the time of charge and discharge is great. For example, the volume expansion in the case of occluding a Li ion is about 1.2 times for a graphite material, but a great volume change (about 4 times) occurs for the Si material since the amorphous state is converted to a crystalline state when Si and Li are alloyed, and there is thus a problem that the cycle lifespan of the electrode decreases. In addition, in the case of a Si negative electrode active material, the capacity and the cycle durability have a trade-off relationship, and there is thus a problem that it is difficult to improve the cycle durability while having a high capacity.

Here, WO 2006/129415 A discloses an invention aimed to provide a nonaqueous electrolyte secondary battery including a negative electrode pellet having a high capacity and an excellent cycle lifespan. Specifically, a silicon-containing alloy is disclosed which is obtained by mixing and wet pulverizing a silicon powder and a titanium powder by a mechanical alloying method and in which a material including a first phase containing silicon as a main body and a second phase containing a silicide of titanium ($TiSi_2$ or the like) is used as a negative electrode active material. It is also disclosed that at least either of these two phases is amorphous or low crystalline.

According to the investigations of the present inventors, in an electric device such as a lithium ion secondary battery using the negative electrode pellet described in WO 2006/129415 A, it has been revealed that the cycle durability is not sufficient in some cases even though it is described that favorable cycle durability can be exhibited.

Accordingly, an object of the present invention is to provide a means capable of improving the cycle durability of an electric device such as a lithium ion secondary battery.

In order to solve the above problems, the present inventors have carried out intensive researches. As a result, it has been found out that the above problems can be solved by controlling the relationship between the diffraction peak intensity of the (111) plane of Si in a specific wavelength range and the diffraction peak intensity of a silicide of a transition metal in a specific wavelength range in the X-ray diffraction measurement of the silicon-containing alloy in a negative electrode active material including a silicon-containing alloy having a structure in which a silicide phase containing a silicide of a transition metal is dispersed in a parent phase containing amorphous or low crystalline silicon as a main component and a predetermined composition, whereby the present invention has been completed.

SUMMARY

That is, the present invention relates to a negative electrode active material for electric device. The negative electrode active material for electric device includes a silicon-containing alloy having a structure in which a silicide phase containing a silicide of a transition metal is dispersed in a parent phase containing amorphous or low crystalline silicon as a main component and a composition represented by the following Chemical Formula (1):

[Chemical Formula 2]

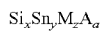 (1)

(in Chemical Formula (1) above, A is an unavoidable impurity,

M is one or two or more transition metal elements, x, y, z, and a represent values in terms of percent by mass, and 0<x<100, 0≤y<100, 0<z<100, and 0≤a<0.5 and x+y+z+a=100).

Moreover, in the negative electrode active material for electric device, a ratio value (B/A) of a diffraction peak intensity B of a silicide of a transition metal in a range of 2θ=37 to 45° to a diffraction peak intensity A of a (111) plane of Si in a range of 2θ=24 to 33° is 0.41 or more in an X-ray diffraction measurement of the silicon-containing alloy using a CuKα1 ray.

According to the present invention, the phase transition between an amorphous state and a crystalline state (crystallization into $Li_{15}Si_4$) when Si is alloyed with Li can be suppressed as the value of B/A is in the range described above. This can suppress expansion and contraction of the silicon-containing alloy constituting the negative electrode active material in a charge and discharge process of the electric device. As a result, the cycle durability of the electric device using this negative electrode active material can be improved.

DESCRIPTION OF THE EMBODIMENTS

Figure 1:
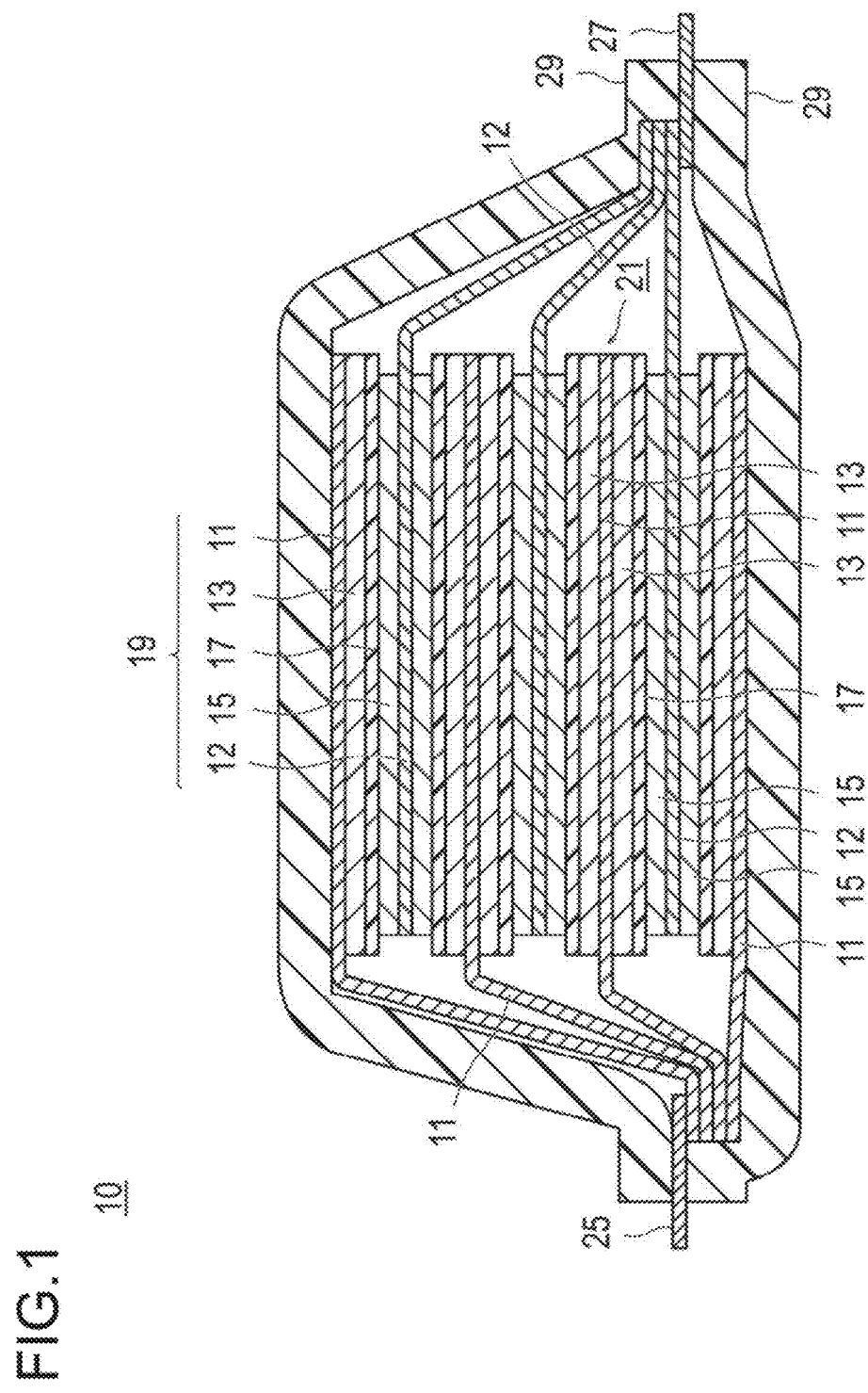
FIG. 1 is a cross-sectional schematic view which schematically illustrates the outline of a stacked type flat non-bipolar lithium ion secondary battery of a representative embodiment of an electric device according to the present invention.

Hereinafter, embodiments of a negative electrode active material for electric device and an electric device using the same of the present invention will be described with reference to the drawings. However, the technical scope of the present invention should be determined based on the description of claims and is not limited to only the following embodiments. Incidentally, in the description of the drawings, the same elements are denoted by the same reference numerals, and duplicate descriptions are omitted. In addition, the dimensional ratios of the drawings are exaggerated for convenience of description and may differ from actual ratios.

Hereinafter, a basic configuration of an electric device to which the negative electrode active material for electric device of the present invention can be applied will be described with reference to the drawings. In the present embodiment, a lithium ion secondary battery will be described as an example of the electric device.

First, in a negative electrode for lithium ion secondary battery of a representative embodiment of a negative electrode containing the negative electrode active material for electric device according to the present invention, and a lithium ion secondary battery using the same, the voltage of the cell (single battery layer) is great and a high-energy density and a high-output density can be achieved. For this reason, a lithium ion secondary battery using the negative electrode active material for lithium ion secondary battery of the present embodiment is excellent for driving power source and auxiliary power source of a vehicle. As a result, it can be suitably used as a lithium ion secondary battery for driving power and the like of a vehicle. In addition to this, it can also be sufficiently applied to a lithium ion secondary battery for mobile devices such as mobile phones.

That is, the lithium ion secondary battery to be a target of the present embodiment may be one that is formed by using the negative electrode active material for lithium ion secondary battery of the present embodiment to be described below, and other constituent requirements thereof are not particularly limited.

For example, in the case of distinguishing the lithium ion secondary battery by the form and structure, it can be applied to any conventionally known form and structure such as a stacked type (flat type) battery and a wound type (cylindrical type) battery. It is advantageous to employ a stacked type (flat type) battery structure from the viewpoint of cost and workability since long-term reliability can be secured by a simple sealing technique such as thermocompression bonding.

In addition, in the case of considering the electrical connection form (electrode structure) in the lithium ion secondary battery, the lithium ion secondary battery can be applied to both a non-bipolar (internal parallel connection type) battery and a bipolar (internal series connection type) battery.

In the case of distinguishing the lithium ion secondary battery by the type of the electrolyte layer therein, the lithium ion secondary battery can also be applied to batteries having any conventionally known type of electrolyte layer such as a solution electrolyte type battery using a solution electrolyte such as a nonaqueous electrolytic solution in the electrolyte layer and a polymer battery using a polymer electrolyte in the electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Accordingly, in the following description, a non-bipolar (internal parallel connection type) lithium ion secondary battery using the negative electrode active material for lithium ion secondary battery of the present embodiment will be significantly briefly described with reference to the drawings. However, the technical scope of the lithium ion secondary battery of the present embodiment is not limited to these.

<Overall Structure of Battery>

FIG. 1 is a cross-sectional schematic view which schematically illustrates the overall structure of a flat type (stacked type) lithium ion secondary battery (hereinafter, also simply referred to as the "stacked type battery") of a representative embodiment of the electric device according to the present invention.

As illustrated in FIG. 1, a stacked type battery 10 of the present embodiment has a structure in which a substantially rectangular power generating element 21 in which a charge and discharge reaction actually proceeds is sealed in the interior of a laminate sheet 29 of an outer package. Here, the power generating element 21 is configured to stack a positive electrode in which a positive electrode active material layer 15 is disposed on both sides of a positive electrode current collector 12, an electrolyte layer 17, and a negative electrode in which a negative electrode active material layer 13 is disposed on both sides of a negative electrode current collector 11. Specifically, the negative electrode, the electrolyte layer, and the positive electrode are stacked in this order such that one positive electrode active material layer 15 and the adjacent negative electrode active material layer 13 face each other via the electrolyte layer 17.

By this, the adjacent positive electrode, electrolyte layer, and negative electrode constitute one single battery layer 19. Hence, it can also be said that the stacked type battery 10 illustrated in FIG. 1 has a configuration in which a plurality of single battery layers 19 are stacked to be electrically connected in parallel. Incidentally, the positive electrode active material layer 15 is disposed only on one side of each of the outermost positive electrode current collectors to be positioned at both outermost layers of the power generating element 21, but the active material layer may be provided on both sides thereof. That is, a current collector which has an active material layer only on one side and is thus dedicated to the outermost layer is not prepared but a current collector having an active material layer on both sides may be used as it is as the outermost current collector. In addition, the positive electrode and the negative electrode may be reversely disposed from FIG. 1 so that the outermost negative electrode current collector is positioned at both outermost layers of the power generating element 21, and the negative electrode active material layer may be disposed on one side or both sides of the outermost negative electrode current collector.

A positive electrode current collecting plate 27 and a negative electrode current collecting plate 25 which are electrically connected to the respective electrodes (the positive electrode and the negative electrode) have a structure in which they are respectively attached to the positive electrode current collector 12 and the negative electrode current collector 11 and led to the outside of the laminate sheet 29 so as to be sandwiched between the end portions of the laminate sheet 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding, or the like if necessary.

The lithium ion secondary battery described above is characterized by a negative electrode. The important constituent members of the battery including the negative electrode will be described below.

<Active Material Layer>

The active material layer 13 or 15 contains an active material, and it further contains other additives if necessary.

[Positive Electrode Active Material Layer]

The positive electrode active material layer 15 contains a positive electrode active material.

(Positive Electrode Active Material)

Examples of the positive electrode active material may include lithium-transition metal composite oxides such as $LiMn_2O_4$, $LiCoO_2$, $LiNiO_2$, $Li(Ni-Mn-Co)O_2$, and those in which a part of these transition metals are substituted with other elements, lithium-transition metal phosphate compounds, and lithium-transition metal sulfate compounds. Depending on the cases, two or more kinds of positive electrode active materials may be used concurrently. A lithium-transition metal composite oxide is preferably used as the positive electrode active material from the viewpoint of capacity and output characteristics. A composite oxide containing lithium and nickel is more preferably used, and $Li(Ni-Mn-Co)O_2$ and those in which a part of these transition metals are substituted with other elements (hereinafter, also simply referred to as the "NMC composite oxide") are still more preferably used. The NMC composite oxide has a layered crystal structure in which a lithium atom layer and a transition metal (Mn, Ni, and Co are orderly disposed) atom layer are alternately stacked via an oxygen atom layer, one Li atom is contained per one atom of the transition metal M, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case may include Ti, Zr, Nb, W, P, Al, Mg, V, Ca, Sr, Cr, Fe, B, Ga, In, Si, Mo, Y, Sn, V, Cu, Ag, and Zn, the other elements are preferably Ti, Zr, Nb, W, P, Al, Mg, V, Ca, Sr, and Cr, the other elements are more preferably Ti, Zr, P, Al, Mg, and Cr, and from the viewpoint of improving the cycle characteristics, the other elements are still more preferably Ti, Zr, Al, Mg and Cr.

The NMC composite oxide preferably has a composition represented by General Formula (1): $Li_aNi_bMn_cCo_dM_xO_2$ (where a, b, c, d, and x satisfy $0.9 \le a \le 1.2$, $0 < b < 1$, $0 < c \le 0.5$, $0 < d \le 0.5$, $0 \le x \le 0.3$, and $b+c+d=1$. M is at least one kind of element selected from Ti, Zr, Nb, W, P, Al, Mg, V, Ca, Sr, or Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. From the viewpoint of cycle characteristics, it is preferable that $0.4 \le b \le 0.6$ be satisfied in General Formula (1). Incidentally, the composition of the respective elements can be measured by, for example, inductively coupled plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, it is preferable that a part of the transition element be substituted with another metal element, and it is particularly preferable that $0 < x \le 0.3$ in General Formula (1). It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

As a more preferred embodiment, it is preferable that b, c, and d satisfy $0.44 \leq b \leq 0.51$, $0.27 \leq c \leq 0.31$, and $0.19 \leq d \leq 0.26$ in General Formula (1) from the viewpoint of improving the balance between capacity and lifespan characteristics. For example, $LiNi_{0.5}Mn_{0.3}Co_{0.2}O_2$ has a greater capacity per unit weight as compared to $LiCoO_2$, $LiMn_2O_4$, $LiNi_{1/3}Mn_{1/3}Co_{1/3}O_2$, and the like that have been proven in general consumer batteries, can improve the energy density, and thus has an advantage of being able to be used in fabrication of a compact and high capacity battery, and it is also preferable from the viewpoint of the cruising distance. Incidentally, $LiNi_{0.8}Co_{0.1}Al_{0.1}O_2$ is more advantageous from the viewpoint of a greater capacity, but it has a disadvantage from the viewpoint of lifespan characteristics. In contrast, $LiNi_{0.5}Mn_{0.3}Co_{0.2}O_2$ exhibits excellent lifespan characteristics comparable to $LiNi_{1/3}Mn_{1/3}Co_{1/3}O_2$.

Depending on the cases, two or more kinds of positive electrode active materials may be used concurrently. A lithium-transition metal composite oxide is preferably used as the positive electrode active material from the viewpoint of capacity and output characteristics. Incidentally, it is needless to say that a positive electrode active material other than those described above may be used.

The average particle diameter of the positive electrode active material contained in the positive electrode active material layer 15 is not particularly limited, but it is preferably from 1 to 30 μm and more preferably from 5 to 20 μm from the viewpoint of increasing the output. Incidentally, in the present specification, the term "particle diameter" means the longest distance among the distances between arbitrary two points on the contour line of the active material particle (observation plane) to be observed by using an observation means such as a scanning electron microscope (SEM) or a transmission electron microscope (TEM). In addition, in the present specification, as the value of "average particle diameter", a value calculated as an average value of the particle diameters of particles to be observed in several to several tens of visual fields by using an observation means such as a scanning electron microscope (SEM) or a transmission electron microscope (TEM) is adopted. The particle diameter and average particle diameter of other constituent components can also be defined in the same manner.

The positive electrode active material layer 15 can contain a binder.

(Binder)

A binder is added for the purpose of binding the active materials with each other or the active material with the current collector and thus maintaining the electrode structure. The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamide-imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), and an epoxy resin. Among them, polyvinylidene fluoride, polyimide, styrene-butadiene, carboxymethyl cellulose, polypropylene, polytetrafluoroethylene, polyacrylonitrile, polyamide, and polyamide-imide are more preferable. These suitable binders exhibit excellent heat resistance, further have a significantly wide potential window, are stable to both the positive electrode potential and the negative electrode potential, and can be thus used in the active material layer. These binders may be used singly or two kinds thereof may be used concurrently.

The amount of binder contained in the positive electrode active material layer is not particularly limited as long as it is an amount in which the active material can be bound, but it is preferably from 0.5 to 15% by mass and more preferably from 1 to 10% by mass relative to the active material layer.

The positive electrode (positive electrode active material layer) can be formed by any method of a kneading method, a sputtering method, a vapor deposition method, a CVD method, a PVD method, an ion plating method, or a thermal spraying method in addition to an ordinary method to coat a slurry.

[Negative Electrode Active Material Layer]

The negative electrode active material layer 13 contains a negative electrode active material.

(Negative Electrode Active Material)

In the present embodiment, the negative electrode active material contains as a main component a silicon-containing alloy having a structure in which a silicide phase containing a silicide of a transition metal is dispersed in a parent phase containing amorphous or low crystalline silicon as a main component and having a predetermined composition.

As described above, the silicon-containing alloy constituting the negative electrode active material in the present embodiment contains a parent phase containing amorphous or low crystalline silicon as a main component. Thus, an electric device which has a high capacity and exhibits excellent cycle durability can be provided when silicon constituting the parent phase is amorphous or low crystalline.

The parent phase constituting the silicon-containing alloy is a phase containing silicon as a main component, and it is preferably a Si single phase (a phase composed only of Si). This parent phase (a phase containing Si as a main component) is a phase involved in occlusion and release of lithium ions at the time of operation of the electric device (lithium ion secondary battery) of the present embodiment, and it is a phase capable of electrochemically reacting with Li. In a case of a Si single phase, it is possible to occlude and release a large amount of Li per unit weight and per unit volume. However, Si exhibits poor electron conductivity, and the parent phase may thus contain trace amounts of additive elements such as phosphorus and boron, transition metals, and the like. Incidentally, it is preferable that this parent phase (a phase containing Si as a main component) is more amorphized than the silicide phase to be described later. By employing such a configuration, the negative electrode active material (silicon-containing alloy) can be formed to have a higher capacity. Incidentally, it is possible to confirm whether the parent phase is more amorphized than the silicide phase or not by electron diffraction analysis. Specifically, according to electron diffraction analysis, a net pattern (lattice-shaped spot) of a two-dimensional point array is obtained for a single crystal phase, the Debye-Scherrer ring (diffraction ring) is obtained for a polycrystalline phase, and a halo pattern is obtained for an amorphous phase. The above confirmation is possible by utilizing this.

Meanwhile, in addition to the parent phase, the silicon-containing alloy constituting the negative electrode active material in the present embodiment also contains a silicide phase which is dispersed in the parent phase and contains a silicide (also referred to as a silicide) of a transition metal. This silicide phase contains a silicide of a transition metal (for example, $TiSi_2$) so as to exhibit excellent affinity for the parent phase and to be able to suppress cracking at the crystal interface particularly due to volume expansion at the time of charge. Furthermore, the silicide phase is superior to the parent phase in electron conductivity and hardness. For this reason, the silicide phase improves low electron conductivity of the parent phase and also plays a role of maintaining the shape of the active material against the stress at the time of expansion.

A plurality of phases may be present in the silicide phase, and, for example, two or more phases (for example, $MSi_2$ and $MSi$) having different composition ratios of the transition metal element M to Si may be present. In addition, two or more phases may be present by containing silicides of different transition metal elements. Here, the kind of the transition metal contained in the silicide phase is not particularly limited, but it is preferably at least one kind selected from the group consisting of Ti, Zr, Ni, Cu, and Fe, more preferably Ti or Zr, and particularly preferably Ti. The silicides formed of these elements have higher electron conductivity than silicides of other elements and a high strength. In particular, $TiSi_2$ of a silicide in a case in which the transition metal element is Ti is preferable since it exhibits significantly excellent electron conductivity.

Particularly, in a case in which the transition metal element M is Ti and two or more phases (for example, $TiSi_2$ and $TiSi$) having different composition ratios are present in the silicide phase, a $TiSi_2$ phase is 50% by mass or more, preferably 80% by mass or more, more preferably 90% by mass or more, particularly preferably 95% by mass or more, and most preferably 100% by mass of the silicide phase.

The size of the silicide phase is not particularly limited, but the size of the silicide phase is 50 nm or less in a preferred embodiment. By employing such a configuration, the negative electrode active material (silicon-containing alloy) can be formed to have a higher capacity.

In the present invention, the silicon-containing alloy constituting the negative electrode active material has a composition represented by the following Chemical Formula (1).

[Chemical Formula 3]

$Si_xSn_yM_zA_a$     (1)

In Chemical Formula (1) above, A is an unavoidable impurity, M is one or two or more transition metal elements, x, y, z, and a represent values in terms of percent by mass, and 0<x<100, 0≤y<100, 0<z<100, and 0≤a<0.5 and x+y+z+a=100 at this time.

As it is apparent from Chemical Formula (1) above, the silicon-containing alloy according to a preferred embodiment of the present invention (having a composition of $Si_xSn_yM_zA_a$) is a binary system (in the case of y=0) of Si and M (transition metal) or a ternary system (in the case of y>0) of Si, Sn, and M (transition metal). Between them, the silicon-containing alloy is more preferably a ternary system of Si, Sn and M (transition metal) from the viewpoint of cycle durability. In addition, in the present specification, the term "an unavoidable impurity" means a component that is present in the raw material or has been unavoidably mixed into the Si-containing alloy during the production process. The unavoidable impurity is not originally required, but it is in a trace amount and does not affect the characteristics of the Si alloy, and it is thus allowable impurity.

In the present embodiment, it is possible to suppress the phase transition between an amorphous state and a crystalline state at the time of alloying Si with Li and thus to improve the cycle lifespan particularly by selecting Ti as an additive element (M; a transition metal) to the negative electrode active material (silicon-containing alloy) and adding Sn as a second additive element if necessary. In addition, by this, a negative electrode active material is formed to have a higher capacity than a conventional negative electrode active material (for example, carbon-based negative electrode active material). Hence, according to a preferred embodiment of the present invention, it is preferable that M be titanium (Ti) in the composition represented by Chemical Formula (1) above. And it is more preferable that the composition represented by Chemical Formula (1) above be a ternary system of Si—Sn—Ti containing titanium as M.

Here, the reason for suppressing the phase transition between an amorphous state and a crystalline state at the time of alloying Si with Li is because transition from an amorphous state to a crystalline state occurs to cause a great change in volume (about fourfold) at the time of alloying Si with Li in a Si material and thus the particles themselves are broken and lose the function as an active material. Hence, by suppressing the phase transition between an amorphous state and a crystalline state, it is possible to suppress collapse of the particles themselves, to maintain the function (high capacity) as an active material, and also to improve the cycle lifespan. By selecting such an additive element, it is possible to provide a Si alloy negative electrode active material having a high capacity and high cycle durability.

In the composition of Chemical Formula (1) above, the composition ratio z of the transition metal M (particularly Ti) is preferably 7<z<100, more preferably 10<z<100, still more preferably 15<z<100, and particularly preferably 20≤z<100. By setting the composition ratio z of the transition metal M (particularly Ti) to be in such a range, the cycle characteristics can be even further improved.

More preferably, x, y, and z in Chemical Formula (1) satisfy the following Mathematical Formula (1) or (2).

[Mathematical Formula 1]

35≤x≤78, 7≤y≤30, 0<z≤37     (1)

35≤x≤52, 30≤y≤51, 0<z≤35     (2)

When the contents of the respective components are in the above ranges, an initial discharge capacity exceeding 1000 Ah/g can be obtained and the cycle lifespan can also exceed 90% (50 cycles).

Incidentally, it is desirable to set the content of the transition metal M (particularly Ti) to be in a range of more than 7% by mass from the viewpoint of attaining further improvement in characteristics of the negative electrode active material. In other words, it is preferable that x, y, and z satisfy the following Mathematical Formula (3) or (4).

[Mathematical Formula 2]

$$35 \leq x \leq 78, 7 \leq y \leq 30, 7 < z \leq 37 \quad (3)$$

$$35 \leq x \leq 52, 30 \leq y \leq 51, 7 < z \leq 35 \quad (4)$$

This makes it possible to even further improve the cycle characteristics.

Moreover, it is preferable that x, y, and z satisfy the following Mathematical Formula (5) or (6):

[Mathematical Formula 3]

$$35 \leq x \leq 68, 7 \leq y \leq 30, 18 \leq z \leq 37 \quad (5)$$

$$39 \leq x \leq 52, 30 \leq y \leq 51, 7 < z \leq 20 \quad (6)$$

from the viewpoint of securing more favorable cycle durability.

Moreover, it is preferable that x, y, and z satisfy the following Mathematical Formula (7):

[Mathematical Formula 4]

$$46 \leq x \leq 58, 7 \leq y \leq 21, 24 \leq z \leq 37 \quad (7)$$

in the negative electrode active material of the present embodiment from the viewpoints of initial discharge capacity and cycle durability.

Incidentally, as described above, A is an impurity (an unavoidable impurity) other than the three components described above, which is derived from raw materials and the production method. a is $0 \leq a < 0.5$ and preferably $0 \leq a < 0.1$.

The silicon-containing alloy constituting the negative electrode active material in the present embodiment is characterized in that the ratio value (B/A) of a diffraction peak intensity B of silicide of a transition metal in a range of $2\theta = 37$ to $45°$ to a diffraction peak intensity A of a (111) plane of Si in a range of $2\theta = 24$ to $33°$ is 0.41 or more in an X-ray diffraction measurement of the silicon-containing alloy using a CuKα1 ray. This ratio value (B/A) is preferably 0.89 or more, more preferably 2.55 or more, and particularly preferably 7.07 or more. In the present application, the X-ray diffraction analysis for calculating the above ratio value of diffraction peaks is conducted by using the method described in the section for Examples to be described later.

Figure 3A:
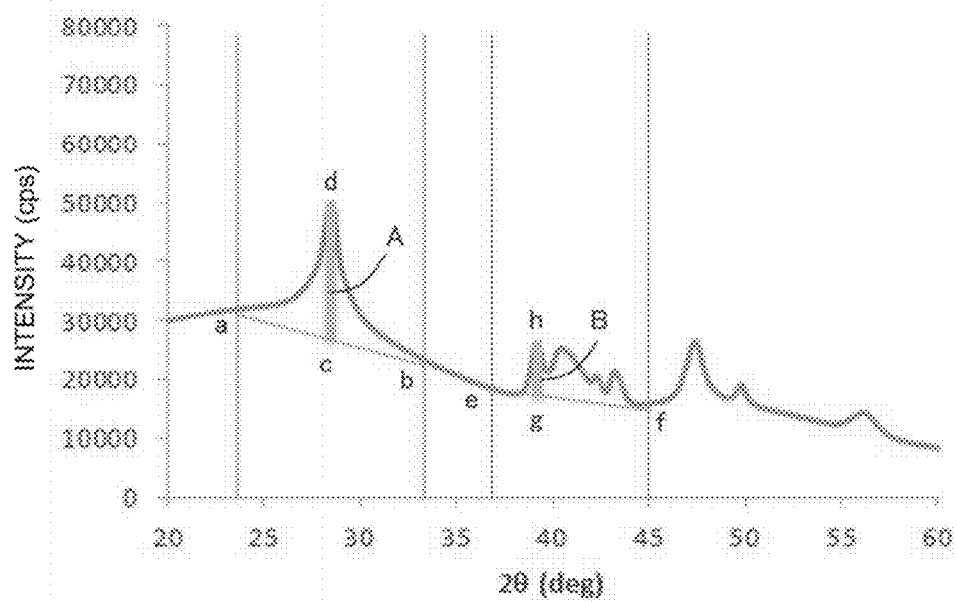
FIG. 3A illustrates a diffraction spectrum of a silicon-containing alloy (negative electrode active material) powder obtained in Example 1 obtained by X-ray diffraction analysis.
Figure 3B:
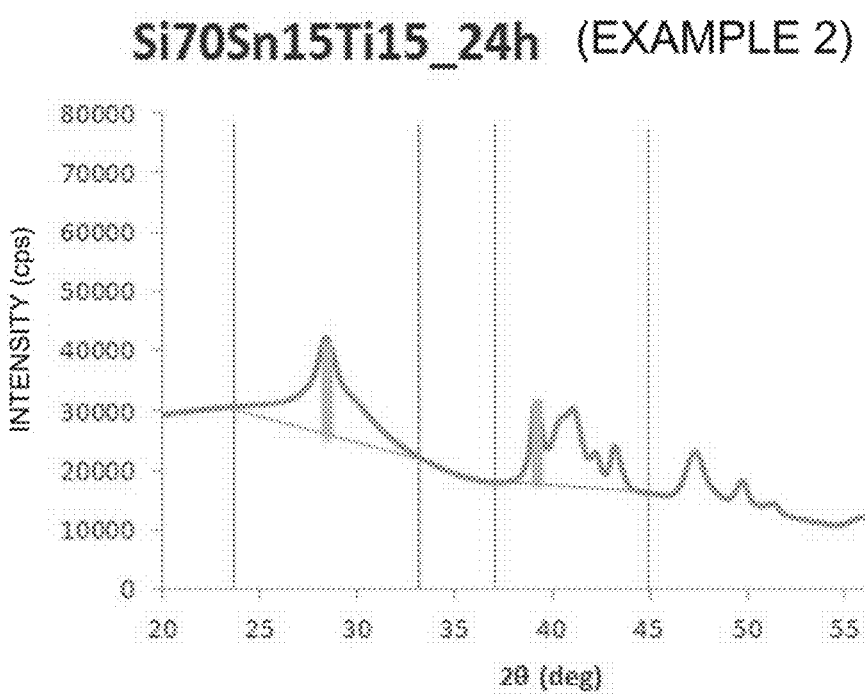
FIG. 3B illustrates a diffraction spectrum of a silicon-containing alloy (negative electrode active material) powder obtained in Example 2 obtained by X-ray diffraction analysis.
Figure 3C:
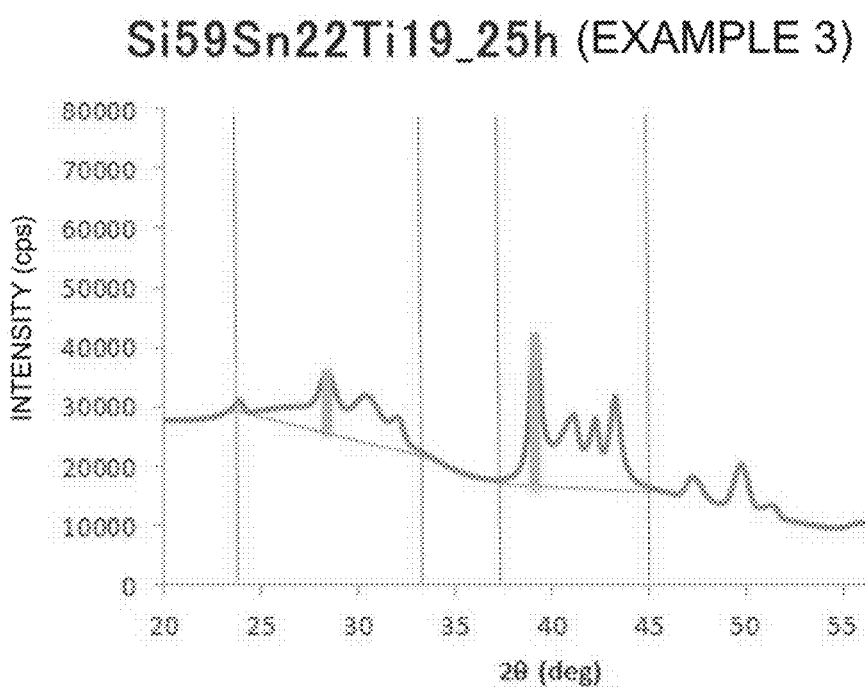
FIG. 3C illustrates a diffraction spectrum of a silicon-containing alloy (negative electrode active material) powder obtained in Example 3 obtained by X-ray diffraction analysis.
Figure 3D:
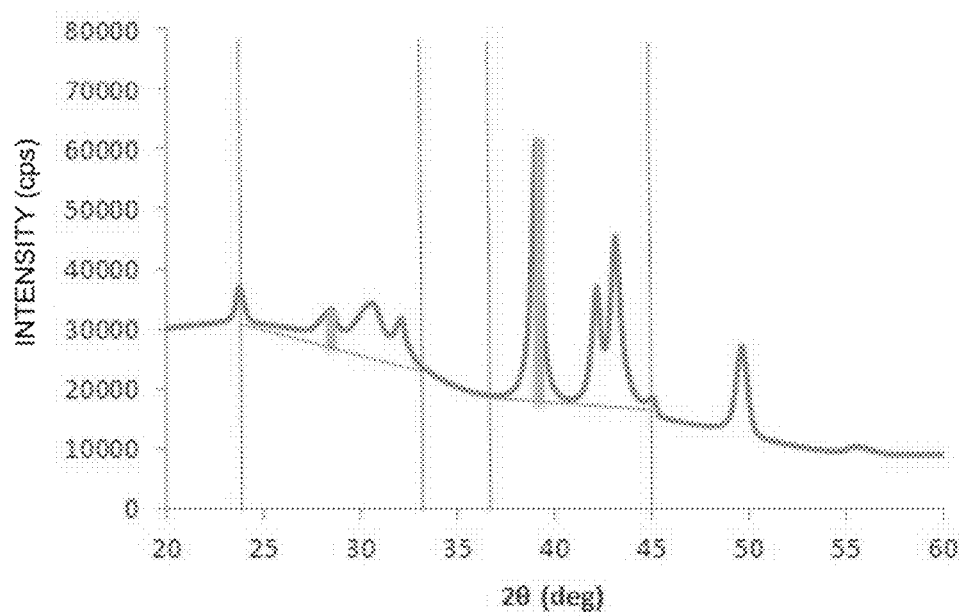
FIG. 3D illustrates a diffraction spectrum of a silicon-containing alloy (negative electrode active material) powder obtained in Example 4 obtained by X-ray diffraction analysis.
Figure 3E:
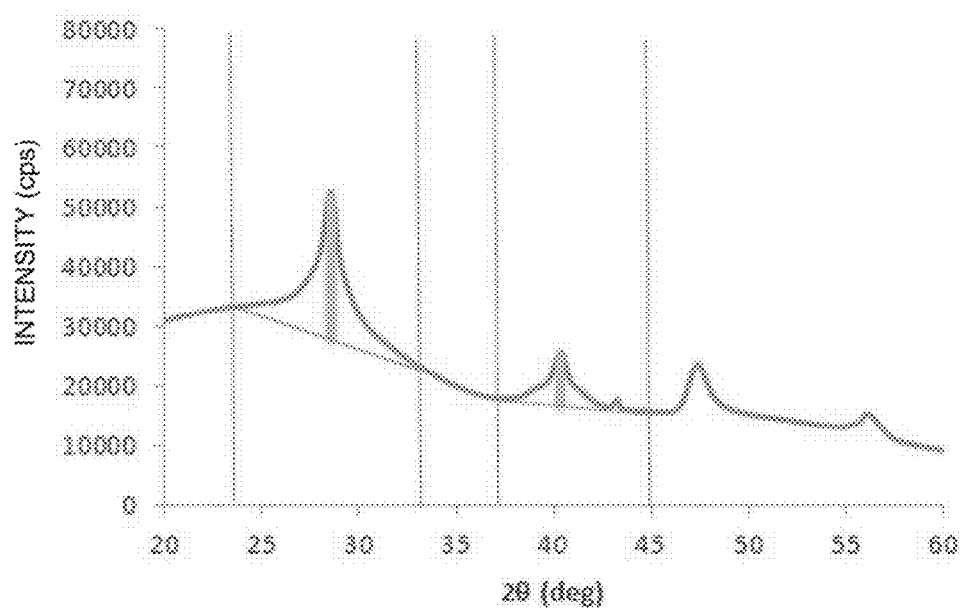
FIG. 3E illustrates a diffraction spectrum of a silicon-containing alloy (negative electrode active material) powder obtained in Comparative Example obtained by X-ray diffraction analysis.

Here, the diffraction peak intensity A of the (111) plane of Si in a range of $2\theta = 24$ to $33°$ can be determined as follows (see FIG. 3A corresponding to the result of Example 1 to be described later).

First, in the diffraction spectrum obtained by X-ray diffraction analysis, the point at which a perpendicular line at $2\theta = 24°$ intersects with the diffraction spectrum is taken as a. In the same manner, the point at which a perpendicular line at $2\theta = 33°$ intersects with the X-ray diffraction spectrum is taken as b. Here, a line segment ab is taken as the base line, and the point at which a perpendicular line at the diffraction peak ($2\theta =$ about $28.5°$) of the (111) plane of Si intersects with the base line is taken as c. Thereafter, the diffraction peak intensity A of the (111) plane of Si can be determined as the length of a line segment cd connecting a vertex d of the diffraction peak ($2\theta =$ about $28.5°$) of the (111) plane of Si and the point c.

In the same manner as the above, the diffraction peak intensity B of silicide of a transition metal in a range of $2\theta = 37$ to $45°$ can also be determined. Hereinafter, the case in which a silicide of a transition metal is $TiSi_2$ will be described as an example.

First, in the diffraction spectrum obtained by X-ray diffraction analysis, the point at which a perpendicular line at $2\theta = 37°$ intersects with the diffraction spectrum is taken as e. In the same manner, the point at which a perpendicular line at $2\theta = 45°$ intersects with the X-ray diffraction spectrum is taken as f. Here, a line segment ef is taken as the base line, and the point at which a perpendicular line of the diffraction peak ($2\theta =$ about $39°$) of $TiSi_2$ intersects with the base line is taken as g. Thereafter, the diffraction peak intensity B of $TiSi_2$ can be determined as the length of a line segment gh connecting a vertex h of the diffraction peak ($2\theta =$ about $39°$) of $TiSi_2$ and the point g.

Here, the specific value of each of the diffraction peak intensity A of the (111) plane of Si and the diffraction peak intensity B of a silicide of a transition metal is not particularly limited, but the diffraction peak intensity A of the (111) plane of Si is preferably from 6000 to 25000 (cps) and more preferably from 6000 to 15000. In addition, the diffraction peak intensity B of a silicide of a transition metal is preferably from 9000 to 46000 (cps) and more preferably from 25000 to 46000 (cps). There is an advantage of being easy to reliably achieve the intensity ratio (B/A) of diffraction peaks described above when A and B are controlled to have values in these ranges.

The particle diameter of the silicon-containing alloy constituting the negative electrode active material in the present embodiment is not particularly limited, but the average particle diameter is preferably from 0.1 to 20 μm and more preferably from 0.2 to 10 μm.

(Method of Producing Negative Electrode Active Material)

The method of producing the negative electrode active material for electric device according to the present embodiment is not particularly limited, and conventionally known knowledge can be appropriately referred to, but in the present application, as an example of a production method for setting the value of the intensity ratio B/A of diffraction peaks obtained by X-ray diffraction analysis to be in the range as described above, a production method including the following steps is provided.

First, a step of mixing raw materials of the silicon-containing alloy to obtain a mixed powder is carried out. In this step, the raw materials of the alloy are mixed in consideration of the composition of the negative electrode active material (silicon-containing alloy) to be obtained. As the raw materials of the alloy, the form and the like thereof are not particularly limited as long as the ratio of elements required as a negative electrode active material can be realized. For example, it is possible to use one obtained by mixing simple substances of elements constituting the negative electrode active material at the intended ratio or an alloy, a solid solution, or an intermetallic compound having the intended element ratio. In addition, raw materials in a powder form are usually mixed. By this, a mixed powder composed of raw materials is obtained. Incidentally, it is possible to control the above intensity ratio (B/A) by adjusting the composition ratio of silicon (Si) and titanium (Ti). For example, it is possible to increase the intensity ratio (B/A) by increasing the composition ratio of Ti to Si.

Subsequently, the mixed powder obtained above is subjected to an alloying treatment. By this, a silicon-containing alloy that can be used as a negative electrode active material for electric device is obtained.

As a method of alloying treatment, there are a solid phase method, a liquid phase method, and a vapor phase method, but examples thereof may include a mechanical alloying method, an arc plasma melting method, a casting method, a gas atomizing method, a liquid quenching method, an ion beam sputtering method, a vacuum deposition method, a plating method, and a vapor phase chemical reaction method. Among them, it is preferable to conduct the alloying treatment by using the mechanical alloying method. It is preferable to conduct the alloying treatment by using the mechanical alloying method since it is possible to easily control the state of the phase. In addition, a step of melting the raw materials or a step of quenching and solidifying the molten material thus molten may be included before the alloying treatment.

In the production method according to the present embodiment, the alloying treatment described above is conducted. This makes it possible to have a structure composed of the parent phase and the silicide phase as described above. It is possible to obtain a negative electrode active material (silicon-containing alloy) capable of exerting desired cycle durability particularly when the time for the alloying treatment (preferably by the mechanical alloying method) is 24 hours or longer. Incidentally, the time for the alloying treatment is preferably 30 hours or longer, more preferably 36 hours or longer, still more preferably 42 hours or longer, and particularly preferably 48 hours or longer. As described above, also by increasing the time for the alloying treatment, the intensity ratio (B/A) of the diffraction peak can be increased. Incidentally, the upper limit value of the time for the alloying treatment is not particularly set, but it may be usually 72 hours or shorter.

The alloying treatment by the method described above is usually conducted in a dry atmosphere, but the particle size distribution after the alloying treatment has a wide width from a small size to a large size in some cases. For this reason, it is preferable to conduct a crushing treatment and/or classification treatment to adjust the particle size.

The predetermined alloy to be essentially contained in the negative electrode active material layer has been described above, but the negative electrode active material layer may contain other negative electrode active materials. Examples of the negative electrode active material other than the predetermined alloy may include carbon such as natural graphite, artificial graphite, carbon black, activated carbon, carbon fiber, coke, soft carbon, and hard carbon, a pure metal such as Si or Sn, or an alloy-based active material having a composition ratio which deviates from the predetermined composition ratio described above, or a metal oxide such as TiO, $Ti_2O_3$, or $TiO_2$ or $SiO_2$, SiO, or $SnO_2$, a composite oxide (a composite nitride) of lithium and a transition metal such as $Li_{4/3}Ti_{5/3}O_4$ or $Li_7MnN$, Li—Pb alloy, Li—Al alloy, or Li. However, from the viewpoint of sufficiently exerting the action and effect obtained by using the predetermined alloy as the negative electrode active material, the content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

Subsequently, the negative electrode active material layer 13 contains a binder.

(Binder)

The binder is added for the purpose of binding the active materials with each other or the active material with the current collector and thus maintaining the electrode structure. The kind of the binder to be used in the negative electrode active material layer is also not particularly limited, and those described above as the binder to be used in the positive electrode active material layer can be used in the same manner. Hence, the detailed description thereon will be omitted here.

Incidentally, the amount of the binder contained in the negative electrode active material layer is not particularly limited as long as it is an amount in which the active material can be bound, but it is preferably from 0.5 to 20% by mass and more preferably from 1 to 15% by mass relative to the negative electrode active material layer.

(Requirements Common to Positive Electrode and Negative Electrode Active Material Layers 15 and 13)

The requirements common to the positive electrode and negative electrode active material layers 15 and 13 will be described below.

The positive electrode active material layer 15 and the negative electrode active material layer 13 contain an electric conductive auxiliary, an electrolyte salt (lithium salt), an ion conductive polymer, and the like if necessary. In particular, the negative electrode active material layer 13 essentially contains an electric conductive auxiliary as well.

(Electric Conductive Auxiliary)

The electric conductive auxiliary is an additive to be blended in order to improve the electric conductivity of the positive electrode active material layer or the negative electrode active material layer. Examples of the electric conductive auxiliary may include carbon materials such as carbon black such as acetylene black, graphite, and vapor-grown carbon fiber. An electronic network which can contribute to improvement of output characteristics of the battery is effectively formed in the interior of the active material layer when the active material layer contains an electric conductive auxiliary.

The content of the electric conductive auxiliary to be mixed in the active material layer is in a range of 1% by mass or more, more preferably 3% by mass or more, and still more preferably 5% by mass or more relative to the total amount of the active material layer. In addition, the content of the electric conductive auxiliary to be mixed in the active material layer is in a range of preferably 15% by mass or less, more preferably 10% by mass or less, still more preferably 7% by mass or less relative to the total amount of the active material layer. The electron conductivity of the active material itself is low, the electrode resistance can be decreased by the amount of the electric conductive auxiliary, and the following effects are exerted by regulating the blending ratio (content) of the electric conductive auxiliary in the active material layer to be in the above range. That is, it is possible to sufficiently ensure the electron conductivity without hindering the electrode reaction, to suppress a decrease in energy density due to a decrease in electrode density, and thus to attain the improvement in energy density due to the improvement in electrode density.

In addition, an electric conductive binder having the functions of both the electric conductive auxiliary and the binder may be used instead of these electric conductive auxiliary and binder or may be concurrently used with one or both of these electric conductive auxiliary and binder. As the electric conductive binder, commercially available TAB-2 (manufactured by Hohsen Corp.) can be used.

(Electrolyte Salt (Lithium Salt))

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer may include a polyethylene oxide-based (PEO) polymer and a polypropylene oxide-based (PPO) polymer.

The blending ratio of the components contained in the positive electrode active material layer and the negative electrode active material layer is not particularly limited. The blending ratio can be adjusted by appropriately referring to known knowledge on nonaqueous solvent secondary batteries.

The thickness of each active material layer (the active material layer on one side of the current collector) is also not particularly limited, and conventionally known knowledge on batteries can be appropriately referred to. As an example, the thickness of each active material layer is usually about from 1 to 500 µm and preferably from 2 to 100 µm in consideration of the intended use (output-oriented, energy-oriented, or the like) of the battery and ion conductivity.

<Current Collector>

The current collectors 11 and 12 are composed of an electric conductive material. The size of the current collector is determined according to the application of the battery. For example, a current collector having a large area is used when the current collector is used in a large battery requiring a high-energy density.

The thickness of the current collector is also not particularly limited. The thickness of the current collector is usually about from 1 to 100 µm.

The shape of the current collector is also not particularly limited. In the stacked type battery 10 illustrated in FIG. 1, a mesh shape (expanded grid or the like) or the like can be used in addition to the current collector foil.

Incidentally, it is desirable to use a current collecting foil in the case of directly forming a thin film alloy of the negative electrode active material on the negative electrode current collector 11 by a sputtering method or the like.

The material constituting the current collector is not particularly limited. For example, a metal or a resin in which an electric conductive filler is added to an electric conductive polymer material or an electric nonconductive polymer material can be employed.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil fabricated by covering aluminum on a metal surface. Among them, aluminum, stainless steel, copper, and nickel are preferable from the viewpoints of electron conductivity, action potential of battery, adhesive property of the negative electrode active material to the current collector by sputtering, and the like.

In addition, examples of the electric conductive polymer material may include polyaniline, polypyrrole, polythiophene, polyacetylene, polyparaphenylene, polyphenylenevinylene, polyacrylonitrile, and polyoxadiazole. Since such an electric conductive polymer material exhibits sufficient electric conductivity even without adding an electric conductive filler thereto and it is thus advantageous from the viewpoint of facilitating the production process or decreasing the weight of the current collector.

Examples of the electric nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such an electric nonconductive polymer material can exhibit excellent electric potential resistance or solvent resistance.

An electric conductive filler may be added to the electric conductive polymer material or electric nonconductive polymer material described above if necessary. An electric conductive filler is necessarily essential in order to impart electric conductivity to the resin particularly in a case in which the resin to be the base material of the current collector is composed only of an electric nonconductive polymer.

The electric conductive filler can be used without being particularly limited as long as it is a substance exhibiting electric conductivity. Examples of a material exhibiting excellent electric conductivity, electric potential resistance, or lithium ion shielding property may include metal and electric conductive carbon. The metal is not particularly limited, but it is preferable to contain at least one kind of metal selected from the group consisting of Ni, Ti, Al, Cu, Pt, Fe, Cr, Sn, Zn, In, Sb, and K or an alloy or metal oxide containing these metals. In addition, the electric conductive carbon is not particularly limited. It is preferably one that contains at least one kind selected from the group consisting of acetylene black, vulcan, black pearl, carbon nanofiber, Ketjen black, carbon nanotube, carbon nanohorn, carbon nanoballoon, and fullerene.

The amount of the electric conductive filler added is not particularly limited as long as it is an amount in which sufficient electric conductivity can be imparted to the current collector, and it is generally about from 5 to 35% by mass.

<Electrolyte Layer>

As the electrolyte constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent may include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

In addition, as the lithium salt, it is possible to employ a compound that can be added to the active material layer of an electrode such as $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$.

Meanwhile, the polymer electrolyte is classified into a gel electrolyte containing an electrolytic solution and an intrinsic polymer electrolyte which does not contain an electrolytic solution.

The gel electrolyte has a configuration in which the liquid electrolyte (electrolytic solution) is injected into a matrix polymer composed of an ion conductive polymer. It is excellent to use a gel polymer electrolyte as the electrolyte from the viewpoint that the fluidity of the electrolyte is eliminated and ionic conduction between the respective layers is easily shielded.

Examples of the ion conductive polymer to be used as the matrix polymer may include polyethylene oxide (PEO), polypropylene oxide (PPO), and a copolymer thereof. Such a polyalkylene oxide-based polymer can readily dissolve an electrolyte salt such as a lithium salt.

The proportion of the liquid electrolyte (electrolytic solution) in the gel electrolyte is not particularly limited, but it is preferably set to about several percent by mass to 98% by mass from the viewpoint of ionic conductivity and the like. In the present embodiment, there is an effect particularly for a gel electrolyte containing a large amount of electrolytic solution, namely, having a proportion of the electrolytic solution of 70% by mass or more.

Incidentally, a separator may be used in the electrolyte layer in a case in which the electrolyte layer is composed of a liquid electrolyte, a gel electrolyte, or an intrinsic polymer electrolyte. Examples of the specific form of the separator (including a nonwoven fabric) may include a microporous membrane formed of a polyolefin such as polyethylene or polypropylene, a porous flat plate, or a nonwoven fabric.

The intrinsic polymer electrolyte has a configuration in which a supporting salt (lithium salt) is dissolved in the matrix polymer described above, and it does not contain an organic solvent as a plasticizer. Hence, liquid leakage from the battery is not concerned and the reliability of the battery can be improved in a case in which the electrolyte layer is composed of the intrinsic polymer electrolyte.

A matrix polymer of the gel electrolyte or the intrinsic polymer electrolyte can exert excellent mechanical strength by forming a crosslinked structure. In order to form a crosslinked structure, a polymerizable polymer (for example, PEO or PPO) for forming a polymer electrolyte may be subjected to a polymerization treatment such as heat polymerization, ultraviolet polymerization, radiation polymerization, or electron beam polymerization using a proper polymerization initiator.

<Current Collecting Plate and Lead>

A current collecting plate may be used for the purpose of taking out the electric current to the outside of the battery. The current collecting plate is electrically connected to the current collector and the lead and brought out to the outside of the laminate sheet of the battery outer packaging material.

The material constituting the current collecting plate is not particularly limited and a known highly electric conductive material which is conventionally used as a current collecting plate for lithium ion secondary battery can be used. As the material constituting the current collecting plate, for example, metal materials such as aluminum, copper, titanium, nickel, stainless steel (SUS), and any alloy thereof are preferable, and aluminum, copper, and the like are more preferable from the viewpoint of light weight, corrosion resistance, and high electric conductivity. Incidentally, the same material or different materials may be used in the positive electrode current collecting plate and the negative electrode current collecting plate.

A positive terminal lead and a negative terminal lead are used if necessary. As a material for the positive electrode terminal lead and the negative electrode terminal lead, a known terminal lead that is used in a lithium ion secondary battery can be used. Incidentally, it is preferable that the portion to be brought out from a battery outer packaging material 29 be covered with a heat-shrinkable tube or the like exhibiting heat resistance and insulation property so as not to affect the products (for example, automotive parts and especially electronic devices) by coming in contact with peripheral devices, wires, and the like and thus causing a short circuit.

<Battery Outer Packaging Material>

As the battery outer packaging material 29, it is possible to use a bag-shaped case which can cover the power generating element and uses a laminate film containing aluminum in addition to a known metal can case. As the laminate film, for example, a laminate film having a three-layer structure formed by laminating PP, aluminum, and nylon in this order, or the like can be used, but the laminate film is not limited to these. A laminate film is preferable from the viewpoint of having a high output and cooling performance and being able to be suitably utilized in a battery for large device for EV and HEV.

Incidentally, the lithium ion secondary battery can be produced by a conventionally known production method.

<Configuration of Appearance of Lithium Ion Secondary Battery>

Figure 2:
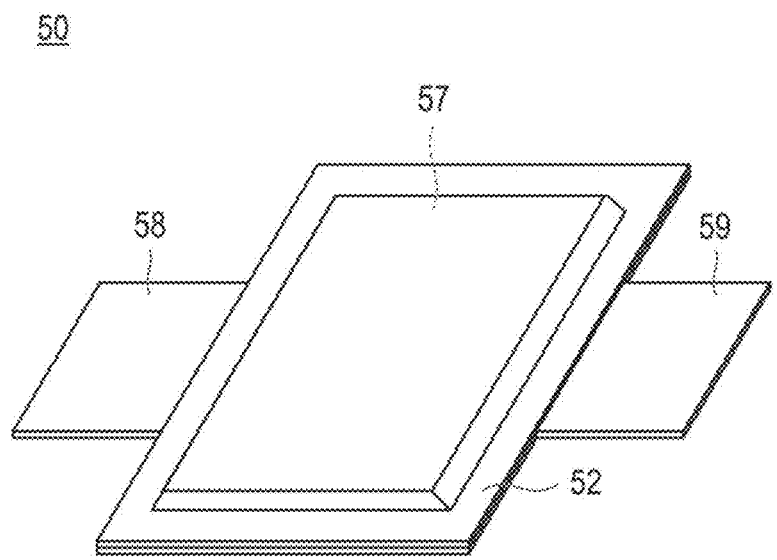
FIG. 2 is a perspective view which schematically illustrates the outer appearance of a stacked type flat lithium ion secondary battery of a representative embodiment of an electric device according to the present invention.

FIG. 2 is a perspective view which illustrates the appearance of a stacked type flat lithium ion secondary battery.

As illustrated in FIG. 2, a stacked type flat lithium ion secondary battery 50 has a rectangular flat shape, and a positive electrode current collecting plate 59 and a negative electrode current collecting plate 58 for taking out electric power are pulled out from both side portions thereof. A power generating element 57 is wrapped in a battery outer packaging material 52 of the lithium ion secondary battery 50, the periphery of the battery outer packaging material 52 is heat-sealed, and the power generating element 57 is hermetically sealed in a state in which the positive electrode current collecting plate 59 and the negative electrode current collecting plate 58 are pulled out to the outside. Here, the power generating element 57 corresponds to the power generating element 21 of the lithium ion secondary battery (stacked type battery) 10 illustrated in FIG. 1. The power generating element 57 is formed by stacking a plurality of single battery layers (single cells) 19 including the positive electrode (positive electrode active material layer) 13, the electrolyte layer 17, and the negative electrode (negative electrode active material layer) 15.

Incidentally, the lithium ion secondary battery is not limited to a stacked type one having a flat shape (laminate cell). The lithium ion secondary battery may be one having a cylindrical shape (coin cell) or one having a prismatic shape (square cell) as a wound type lithium ion battery, one obtained by deforming the one having a cylindrical shape to have a rectangular flat shape, and further a cylindrical cell, and it is not particularly limited. In one having a cylindrical or prismatic shape, a laminate film or a conventional cylindrical can (metal can) may be used as the outer packaging material thereof, and the outer packaging material is not particularly limited. Preferably, the power generating element is packaged in an aluminum laminate film. The weight saving can be achieved by this form.

In addition, bringing out of the positive electrode current collecting plate 59 and the negative electrode current collecting plate 58 illustrated in FIG. 2 is not also particularly limited. The positive electrode current collecting plate 59 and the negative electrode current collecting plate 58 may be pulled out from the same side or each of the positive electrode current collecting plate 59 and the negative electrode current collecting plate 58 may be divided into a plurality of pieces and taken out from each side, and the bringing out is not limited to that illustrated in FIG. 2. In addition, in a wound type lithium ion battery, terminals may be formed by utilizing, for example, a cylindrical can (metal can) instead of a current collecting plate.

As described above, the negative electrode and the lithium ion secondary battery which are formed by using the negative electrode active material for lithium ion secondary battery of the present embodiment can be suitably utilized as a large capacity power source for electric vehicles, hybrid electric vehicles, fuel cell vehicles, hybrid fuel cell vehicles, and the like. That is, they can be suitably utilized in a vehicle driving power source and an auxiliary power source which are required to have a high-volume energy density and a high-volume output density.

Incidentally, in the above embodiment, a lithium ion battery has been exemplified as an electric device, but the present invention is not limited thereto, and the negative electrode active material can also be applied to secondary batteries of other types and even primary batteries. In addition, it can be applied not only to batteries but also to capacitors.

The invention will be described in more detail with reference to the following Examples. However, the technical scope of the present invention is not limited to only the following Examples.

Example 1

Production of Silicon-Containing Alloy

A silicon-containing alloy ($Si_{80}Sn_{10}Ti_{10}$) (unit: % by mass, the same applies hereinafter) was produced by a mechanical alloying method. Specifically, by using a planetary ball mill apparatus P-6 manufactured by Fritsch GmbH, zirconia crushing balls and raw material powders of the alloy were put in a zirconia crushing pot, alloyed at 600 rpm for 24 hours (alloying treatment), and then subjected to a crushing treatment at 400 rpm for 1 hour. Incidentally, the average particle diameter of the silicon-containing alloy (negative electrode active material) powder thus obtained was 0.3 μm.

[Fabrication of Negative Electrode]

Mixed were 80 parts by mass of the silicon-containing alloy ($Si_{80}Sn_{10}Ti_{10}$) thus produced as the negative electrode active material, 5 parts by mass of acetylene black as an electric conductive auxiliary, and 15 parts by mass of polyamide-imide as a binder, the mixture thus obtained was dispersed in N-methylpyrrolidone (NMP) to obtain a negative electrode slurry. Subsequently, the negative electrode slurry thus obtained was uniformly coated on both sides of a negative electrode current collector formed of a copper foil such that the thickness of each of the negative electrode active material layer was 30 μm, and dried in a vacuum for 24 hours, thereby obtaining a negative electrode.

[Fabrication of Lithium Ion Secondary Battery (Coin Cell)]

The negative electrode thus fabricated and the counter electrode Li were allowed to face each other, and a separator (Polyolefin, film thickness: 20 μm) was disposed therebetween. Subsequently, the stacked body of the negative electrode, the separator, and the counter electrode Li was disposed on the bottom side of a coin cell (CR 2032, material: stainless steel (SUS 316)). Furthermore, a gasket was fitted to maintain the insulation between the positive electrode and the negative electrode, the following electrolytic solution was injected by using a syringe, a spring and a spacer were stacked thereon, the upper side of the coin cell was superimposed thereon, and caulking was conducted to hermetically seal the coin cell, thereby obtaining a lithium ion secondary battery.

Incidentally, as the electrolytic solution, a solution prepared by dissolving lithium hexafluorophosphate ($LiPF_6$) as a lithium salt in an organic solvent in which ethylene carbonate (EC) and diethyl carbonate (DEC) were mixed at a proportion of EC:DEC=1:2 (volume ratio) at a concentration of 1 mol/L was used.

Example 2

A negative electrode active material, a negative electrode, and a lithium ion secondary battery (coin cell) were prepared by the same method as in Example 1 described above except that the composition of the silicon-containing alloy was changed to $Si_{70}Sn_{15}Ti_{15}$. Incidentally, the average particle diameter of the silicon-containing alloy (negative electrode active material) powder thus obtained was 0.3 μm.

Example 3

A negative electrode active material, a negative electrode, and a lithium ion secondary battery (coin cell) were prepared by the same method as in Example 1 described above except that the composition of the silicon-containing alloy was changed to $Si_{59}Sn_{22}Ti_{19}$ and the time for the alloying treatment when preparing the silicon-containing alloy was changed to 25 hours. Incidentally, the average particle diameter of the silicon-containing alloy (negative electrode active material) powder thus obtained was 0.3 μm.

Example 4

A negative electrode active material, a negative electrode, and a lithium ion secondary battery (coin cell) were prepared by the same method as in Example 3 described above except that the time for the alloying treatment when preparing the silicon-containing alloy was changed to 50 hours. Incidentally, the average particle diameter of the silicon-containing alloy (negative electrode active material) powder thus obtained was 0.3 μm.

Comparative Example

A negative electrode active material, a negative electrode, and a lithium ion secondary battery (coin cell) were prepared by the same method as in Example 1 described above except that the composition of the silicon-containing alloy was changed to $Si_{90}Ti_{10}$. Incidentally, the average particle diameter of the silicon-containing alloy (negative electrode active material) powder thus obtained was 0.3 μm.

[Analysis of Textural Structure of Negative Electrode Active Material] The textural structure of the negative electrode active material (silicon-containing alloy) prepared in each of Examples 1 to 4 and Comparative Example was analyzed by the electron diffraction method, as a result, diffraction spots and halo patterns indicating the crystallinity of the silicide phase ($TiSi_2$) were observed in any of Examples 1 to 4 and Comparative Example, and it was confirmed that the negative electrode active materials had a textural structure in which a crystalline silicide phase was dispersed in the amorphous Si phase of the parent phase.

The crystalline structure of the negative electrode active material (silicon-containing alloy) prepared in each of Examples 1 to 4 and Comparative Example was analyzed by the X-ray diffraction measurement method. The apparatus and conditions used in the X-ray diffraction measurement method are as follows.

Name of apparatus: X-ray diffractometer (SmartLab 9 kW) manufactured by Rigaku Corporation Voltage and current: 45 kV and 200 mA X-ray wavelength: CuKα1

Here, the X-ray diffraction spectra obtained for each of the negative electrode active materials (Si-containing alloys) of Examples 1 to 4 and Comparative Example are illustrated in FIGS. 3A to 3E. In addition, the value of diffraction peak intensity A of the (111) plane of Si in a range of 2θ=24 to 33°, the value of diffraction peak intensity B of $TiSi_2$ in a range of 2θ=37 to 45°, and the ratio value (B/A) of these values obtained from these X-ray diffraction spectra are presented in the following Table 1. Incidentally, it has also been confirmed that the entire Ti contained in the silicon-containing alloy is present as a silicide (TiSi$_2$) phase by this X-ray diffraction analysis.

[Evaluation of Cycle Durability] The cycle durability of each lithium ion secondary battery (coin cell) fabricated as above was evaluated under the following charge and discharge test conditions.

(Charge and Discharge Test Conditions)

1) Charge and Discharge Tester: HJ 0501 SMSA (manufactured by HOKUTO DENKO CORP.)

2) Charge and discharge conditions

[Charge process] 0.3 C, 2 V→10 mV (constant current and constant voltage mode)

[Discharge process] 0.3 C, 10 mV→2 V (constant current mode)

3) Thermostatic chamber: PFU-3K (manufactured by ESPEC CORP.)

4) Evaluation temperature: 300 K (27° C.).

The evaluation cell was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell (coin cell) was discharged from 10 mV to 2 V at 0.3 C in a constant current mode in the discharge process (referred to as the process of deintercalating Li from the evaluation electrode). The charge and discharge cycle described above was taken as one cycle, and charge and discharge test was conducted from the initial cycle (1st cycle) to the 50th cycle under the same charge and discharge conditions. Thereafter, the result for the proportion (discharge capacity retention rate [%]) of the discharge capacity in the 50th cycle to the discharge capacity in the 1st cycle is presented in the following Table 1.

TABLE 1

| Negative electrode active material | Time for MA treatment (h) | Peak intensity B of TiSi$_2$ (cps) | Peak intensity A of Si (cps) | Peak intensity ratio B/A | Discharge capacity retention rate after 50 cycles (%) |
| --- | --- | --- | --- | --- | --- |
| Example 1 | Si$_{80}$Sn$_{10}$Ti$_{10}$ | 24 | 9750 | 23550 | 0.41 | 57.4 |
| Example 2 | Si$_{70}$Sn$_{15}$Ti$_{15}$ | 24 | 14550 | 16350 | 0.89 | 69.8 |
| Example 3 | Si$_{59}$Sn$_{22}$Ti$_{19}$ | 25 | 27150 | 10650 | 2.55 | 75.7 |
| Example 4 | Si$_{59}$Sn$_{22}$Ti$_{19}$ | 50 | 45600 | 6450 | 7.07 | 96.0 |
| Comparative Example | Si$_{90}$Ti$_{10}$ | 24 | 9000 | 25200 | 0.36 | 43.1 |

From the results presented in Table 1, it can be seen that the discharge capacity retention rate after 50 cycles is maintained at a high value and excellent cycle durability is exhibited in the lithium ion batteries using the negative electrode active materials according to the present invention.

REFERENCE SIGNS LIST 10 and 50 Lithium ion secondary battery (stacked type battery)
11 Negative electrode current collector
12 Positive electrode current collector
13 Negative electrode active material layer
15 Positive electrode active material layer
17 Electrolyte layer
19 Single battery layer
21 and 57 Power generating element
25 and 58 Negative electrode current collecting plate
27 and 59 Positive electrode current collecting plate
29 and 52 Battery outer packaging material (laminate film)

The invention claimed is:

1. A negative electrode active material for electric device comprising a silicon-containing alloy having;
a structure including a silicide phase which contains a silicide of a transition metal and is dispersed in a parent phase containing amorphous or low crystalline silicon as a main component and
a composition represented by the following Chemical Formula (I):

$$Si_xSn_yM_zA_a \quad (1)$$

wherein A is an unavoidable impurity, M is Ti, x, y, z, and a represent values in terms of percent by mass, and $$35 \leq x \leq 78,\ 7 \leq y \leq 30,\ 0 < z \leq 37,\ \text{and}\ 0 \leq a < 0.5\ \text{and}\ x+y+z+a=100),$$

wherein a ratio value (B/A) of a diffraction peak intensity B of a silicide of a transition metal in a range of 2θ=37 to 45° to a diffraction peak intensity A of a (111) plane of Si in a range of 2θ=24 to 33° is 2.55 or more in an X-ray diffraction measurement of the silicon-containing alloy using a CuKα1 ray.

2. The negative electrode active material for electric device according to claim 1, wherein B/A is 7.07 or more.

3. The negative electrode active material for electric device according to claim 1, wherein the diffraction peak intensity A (cps) of the (111) plane of Si is from 6000 to 25000 and the diffraction peak intensity B (cps) of a silicide of a transition metal is from 9000 to 46000.

4. The negative electrode active material for electric device according to claim 1, wherein the diffraction peak intensity A (cps) of the (111) plane of Si is from 6000 to 15000 and the diffraction peak intensity B (cps) of a silicide of a transition metal is from 25000 to 46000.

5. The negative electrode active material for electric device according to claim 1, wherein the parent phase is more amorphized than the silicide phase.

6. The negative electrode active material for electric device according to claim 1, wherein a size of the silicide phase is 50 nm or less.

7. A negative electrode for electric device comprising the negative electrode active material for electric device set forth in claim 1.

8. An electric device comprising the negative electrode for electric device set forth in claim 7.

9. A negative electrode active material for electric device comprising:
a silicon-containing alloy having a silicide phase which contains a silicide of a transition metal and a parent phase containing amorphous or low crystalline silicon as a main component, the silicide phase dispersed in the parent phase, the silicon-containing alloy having a composition represented by the following Chemical Formula (I):

$$Si_xSn_yM_zA_a \quad (1)$$

wherein A is an unavoidable impurity, M is TI, and $35<x<78$, $7<y<30$, $7<z<37$, and $0\leq a<0.5$ and $x+y+z+a=100$ in percent by mass, wherein a ratio value (B/A) of a diffraction peak intensity B of a silicide of a transition metal in a range of $2\theta=37$ to $45°$ to a diffraction peak intensity A of a (111) plane of Si in a range of $2\theta=24$ to $33°$ is 2.55 or more in an X-ray diffraction measurement of the silicon-containing alloy using a CuKα1 ray.

10. A negative electrode active material for electric device comprising a silicon-containing alloy having;

a structure including a silicide phase which contains a silicide of a transition metal and is dispersed in a parent phase containing amorphous or low crystalline silicon as a main component and a composition represented by the following Chemical Formula (I):

$$Si_xSn_yM_zA_a \quad (1)$$

wherein A is an unavoidable impurity, M is Ti, x, y, z, and a represent values in terms of percent by mass, and $35 \leq x \leq 52$, $30 \leq y \leq 51$, $0 < z \leq 35$, and $0 \leq a < 0.5$ and $x+y+z+a=100$), wherein a ratio value (B/A) of a diffraction peak intensity B of a silicide of a transition metal in a range of $2\theta=37$ to $45°$ to a diffraction peak intensity A of a (111) plane of Si in a range of $2\theta=24$ to $33°$ is 2.55 or more in an X-ray diffraction measurement of the silicon-containing alloy using a CuKα1 ray.

* * * * *